Dec. 9, 1969   L. K. LUGTEN   3,483,499
INDUCTIVE DEVICE

Filed Aug. 8, 1968   2 Sheets-Sheet 1

INVENTOR
LEO K. LUGTEN
BY

Dec. 9, 1969 L. K. LUGTEN 3,483,499
INDUCTIVE DEVICE
Filed Aug. 8, 1968 2 Sheets-Sheet 2
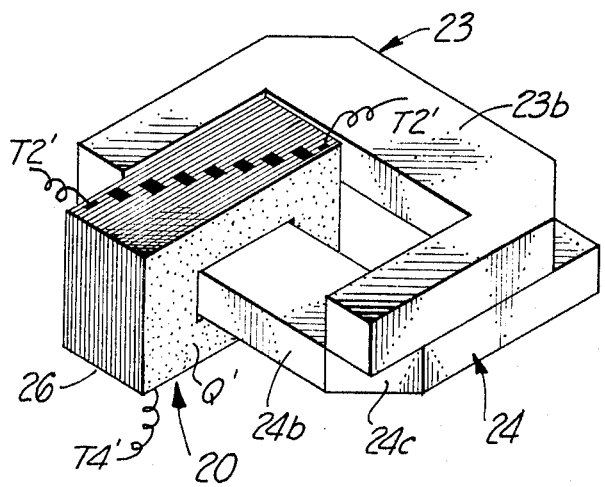
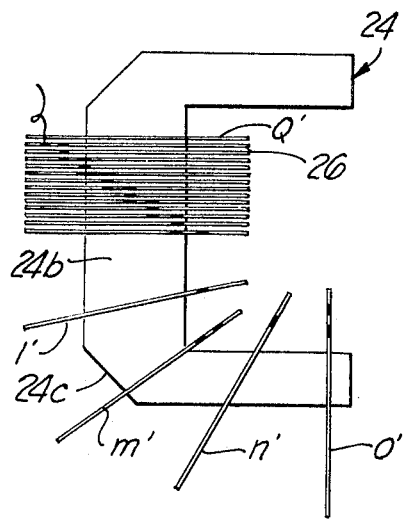
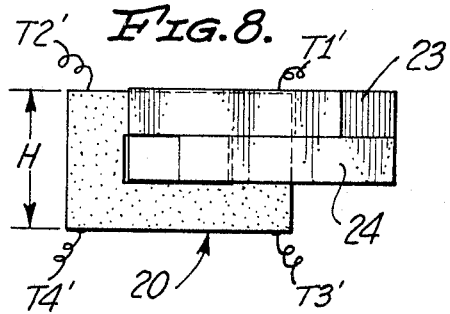
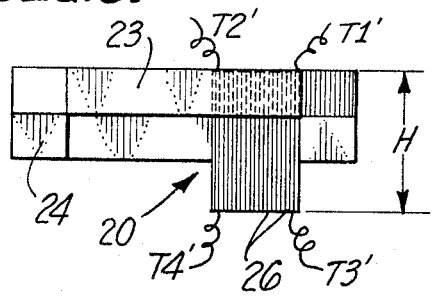
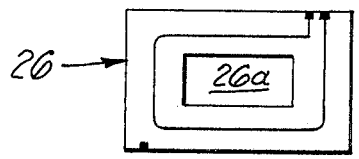
INVENTOR
LEO K. LUGTEN
BY
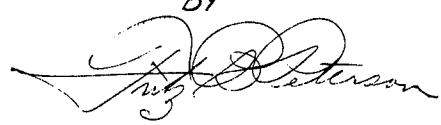

United States Patent Office 3,483,499
Patented Dec. 9, 1969

3,483,499
INDUCTIVE DEVICE
Leo K. Lugten, Riverside, Calif., assignor to Bourns, Inc., a corporation of California
Filed Aug. 8, 1968, Ser. No. 751,156
Int. Cl. H01f 27/28, 5/00
U.S. Cl. 336—180
3 Claims

ABSTRACT OF THE DISCLOSURE

A structure comprising a magnetic core forming a magnetic circuit or closed flux path, and a portion of which core etxends through an aperture formed in each of a set of flat insulative plates or wafers which are stacked or superimposed to form a unit, each of the plates bearing a deposited-film conductor so applied as to form one or more loops or turns around the aperture, and each of the plates bearing terminal means to which the respective conductors are connected, and the terminals of the several plates connected to provide a series winding in the case of an inductor or to provide two or more separate windings in the case of a transformer.

---

The construction of an inductor (inductive reactor, or inductance), and that of a transformer, consisting of a core of magnetizable material and one or more insulated coils or windings, is generally well known. Such devices, especially as adapted for operations with high frequency electric pulses and like signals, are often comprised of a small toroidal core of a selected ferrite material, and one or more coils or windings of insulated conductive wire wrapped on the core. For many applications, the cores are so small that winding by machine is impractical, and resort is had to winding by hand. The latter is expensive and satisfactory uniformity of product is difficult to achieve. As a consequence, efforts have been made to produce very small inductive devices using two-piece ferrite cores, which permit use of a pre-wound winding or a winding wound directly on one of the pieces of the core. An improved type of inductive device according to that scheme of production is disclosed in my copending application for Letters Patent Ser. No. 751,157, filed concurrently herewith, and in which improved device desirable novel characteristics are attained in respect of spatial configuration of the device as a whole. In general, the core pieces or members are formed as twins and of U-shape with identical limbs, and have mating faces of the legs or limbs lapped so as to permit of maximum reduction of the over-all magnetic flux-path reluctance. In that application the winding means comprises a bobbin mounted on the bridge of one of the U-cores and insulated wire coil means wound around the core bridge between the core limbs. The limbs of one core member are superimposed upon those of the other core member, providing a relatively large flux-transfer area across which the magnetic flux in the magnetic circuit traverses from either core to the other. To reduce the elevation profile or height of the device, the cores are made thin and with wide bridges, and the coil means is thus relatively flat and thin.

In the present invention the same arrangement of two superimposed ferrite U-cores may be utilized, or depending upon available area for mounting, or if air gap is of less significance, other configurations of cores may be used. For instance, in the latter case, E-core means may be used, as illustrated in the drawings. Distinguishing from the companion invention, in the present invention the inductive winding means are not made of turns or coils of wire, the insulation of which may break down and fail in a high-temperature environment. Rather, and whereby to provide an inductive device which is capable of continuous performance for extended periods of time in a very hot environment, the winding means of the present invention is of conductive elements formed in loop configuration on one or more faces of ceramic or like insulative plates or wafers. The conductive elements extend to respective edge areas of the wafers, the wafers are laminated, and the edge-terminations may be interconnected to effect serial connection of the respective loops or turns on the several wafers or laminae. As is evident, or as will hereinafter be made so, primary and secondary loops or turns may be interspersed to provide distributed windings, or the sets of wafers may be so disposed as to provide spaced-apart primary and secondary coils or windings.

The preceding general statements concerning the invention and its environment make it evident that it is a principal broad object of the invention to provide improvements in very small inductive devices of the type adapted for flat mounting on circuit boards used in operations with electric pulse signals. A more specific object of the invention is to provide a miniature magnetic inductive device capable of continuous operation at temperatures approaching the Curie point of the core material of the device. Other objects and advantages of the invention will hereinafter be defined or made evident in the appended claims and the following description of the presently preferred exemplary embodiment of an inductive device embodying the invention as illustrated in the accompanying drawings in which:

FIGURE 6 is a pictorial view of an inductive device according to the invention, devised to present a minimum elevational profile, the scale of the drawing being grossly enlarged to clearly portray details;

FIGURE 7 is a plan view of a portion only of the device shown in FIGURE 6, illustrating assembly of wafers and insulators on a magnetic U-core member;

FIGURE 8 is a view in elevation showing spatial relationship of assembled portions of the device depicted in FIGURE 6;

FIGURE 9 is a view similar to FIGURE 8 but showing a different face of the device; and FIGURE 10 is a plan view of a wafer of the device of FIGURE 6, showing relationship of apertures and conductive elements of a typical wafer.

Figure 1:
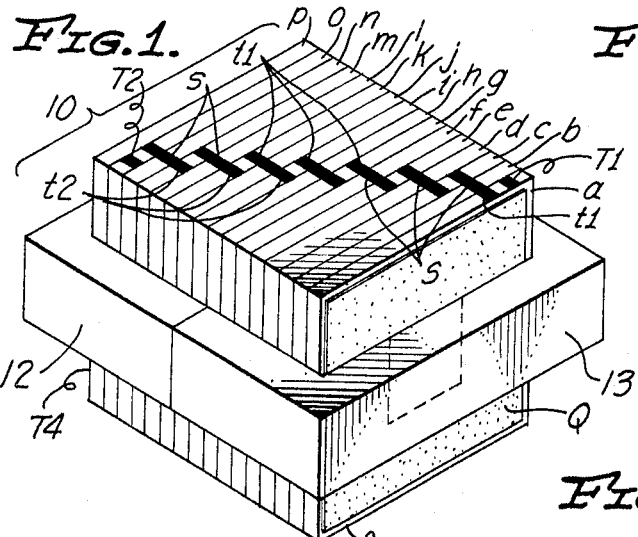
FIGURE 1 is a pictorial view to grossly enlarged scale of the exemplary inductive device in the form of a transformer with distributed windings, prior to attachment of mounting means.
Figure 5:
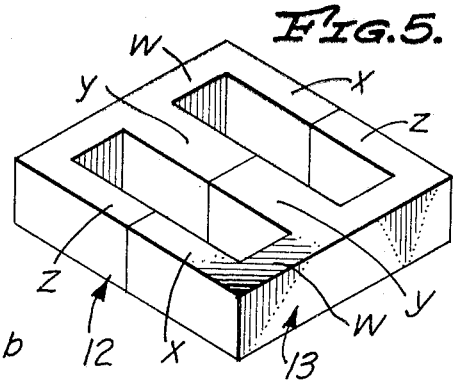
FIGURE 5 is a pictorial view of the E-core members comprised in the inductive device depicted in FIGURE 1, but to a different scale, showing relative dimensions and configurations.

Referring to FIGURE 1, the exemplary inductive device as a whole is designated by number 10. It comprises first and second E-core members 12 and 13 (see also FIGURE 5) which are made of magnetic material such as a selected ferrite. The device further comprises one or more sets of insulative heat-resistant wafers such as ceramic wafer $k$ (FIGURE 2) each of which is formed as a thin plate with a central aperture for reception of a portion of the core structure and is provided with at least one conductor loop such as conductive turn $u$ (FIGURE 2) and conductive terminals for the turn, such as $t1$ and $t2$. The wafers, which are illustrated as being of rectangular shape, may be, in some cases, of circular or of other plan form. A preferred material for the wafer is alumina, but steatite or other ceramic or insulative material having stability at all temperatures below the Curie point of the magnetic core may be used. In the exemplary device illustrated, the wafers are of the order of three mils thick, and two hundred mils square.

Figure 2:
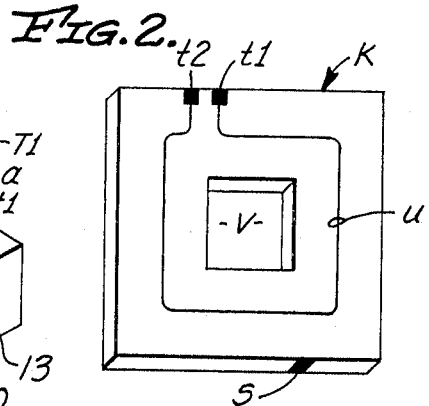
FIGURE 2 is a pictorial view of a selected one of the wafers comprised in the composite structure shown in FIGURE 1, and illustrating an edge-conductor or bridge device and its placement to facilitate interconnection of coils or windings on alternate wafers of an integrated stack of wafers comprised in the exemplary inductive device.
Figure 3A:
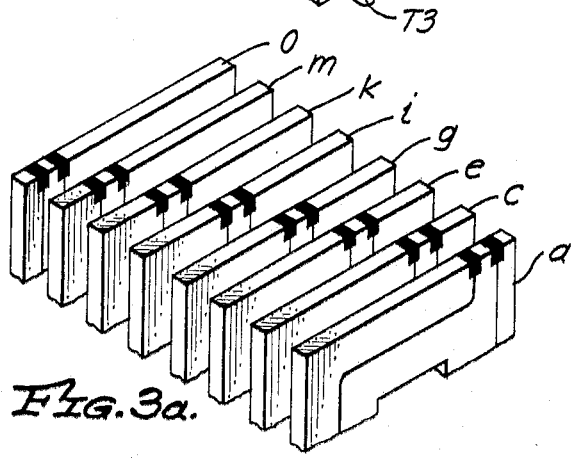
FIGURE 3a is a fragmentary exploded view of the wafers comprised in the primary winding means of the exemplary device depicted in FIGURE 1.

The conductive coil members, such as that designated $u$ in FIGURE 2, and the terminal devices such as $t1$ and $t2$, are produced by silk-screening onto the wafer a conductive paint, such as silver paint, and firing the applied paint to form a conductor; or, alternatively, by metallizing the surface of the wafer and etching-away the undesired portions. Alternatively, other known procedures may be followed, the essential result being a conductive turn or loop, $u$, extending around the aperture, $v$, and connecting at respective ends to the set of terminals $t1$ and $t2$. The terminals of each set are extended so as to lie or extend in part on and across the adjacent edge of the respective wafer, and terminal sets are staggered, as indicated in FIGURES 1 and 3a, whereby interconnection of certain pairs of the terminals is facilitated to provide serial connection of loops or turns of selected wafers, as will presently be more fully explained. As is made evident in FIGURE 1, the wafers are assembled in face-to-back contact, and may have a thin layer or sheet of insulation therebetween.

While the winding or coil means of the inductive device need comprise only one coil, as in an inductor or inductive reactor, two or more coils are used in a transformer; and accordingly the invention is illustrated herein in the more complex form comprising two insulated windings or coils. Thus, in FIGURE 1, the inductive device is a transformer having a primary winding provided by the conductor turns (such as coil $u$, FIGURE 2) carried on alternate insulative wafers, $a$, $c$, $e$, $g$, $i$, $k$, $m$, and $o$ and a secondary winding provided by the conductor turns carried on intervening wafers, $b$, $d$, $f$, $h$, $j$, $l$, $n$ and $p$. The two sets of wafers, here for convenience called primary wafers and secondary wafers, respectively, are shown as equally distributed and equal in number whereby to provide a 1:1 turns ratio; but it will be understood that the sets may be otherwise distributed and may be of unlike numbers of wafers. Further, as will be explained later herein in connection with FIGURE 4, one or more of the sets of wafers may comprise wafers each of which carries a plurality of conductor turns or loops.

In the illustrated exemplary embodiment of the invention, the primary turns are interleaved with the secondary wafers. As a consequence, the first and second terminal devices, $t1$ and $t2$, respectively, of the first primary wafer $a$, for example, are separated from the like but differently positioned terminals of the second primary wafer $c$, and so on throughout the set of primary wafers. The same is true in the case of the secondary wafers. Thus to connect second terminal $t2$ of primary wafer $a$ to the first terminal $t1$ of primary wafer $c$, a bridging connection across the intervening secondary wafer $b$ is necessary. While wire bridge connectors may be soldered to the terminals to perform the interconnecting function, it is preferred to apply an auxiliary conductive device, such as that denoted $s$ in FIGURES 1 and 2, at the appropriate location on either wafer at another edge of the intervening wafer, for example and as shown, at the edge opposite the edge on which terminals $t1$ and $t2$ are disposed. Thus, as is indicated in FIGURE 1, the secondary terminal, $t2$, of primary wafer $a$ is disposed to contact auxiliary conductive device $s$ of secondary wafer $b$, and device $s$ is also disposed to contact first terminal $t1$ of primary wafer $c$. Thus the winding or loop $u$ of wafer $a$ is serially connected with the similar loop of wafer $c$. Appropriately spaced other auxiliary conductive devices $s$ on the other secondary wafers, as indicated in FIGURE 1, serve to connect all the primary wafer turns in series, whereby a complete inductive circuit of several turns is provided between the first terminal $t1$ of wafer $a$ and the second terminal $t2$ of wafer $o$. Following stacking and adhesive bonding of the wafers, electrical interconnections of terminals may be enhanced by application of additional conductive material over appropriate areas of terminal pairs ($t1$, $t2$) and bridging members $s$, as will hereinafter be more fully described. To complete the primary winding, terminal leads T1 and T2 may be soldered or welded to terminal $t1$ of wafer $a$ and terminal $t2$ of wafer $o$, to form external primary winding connections.

Figure 3B:
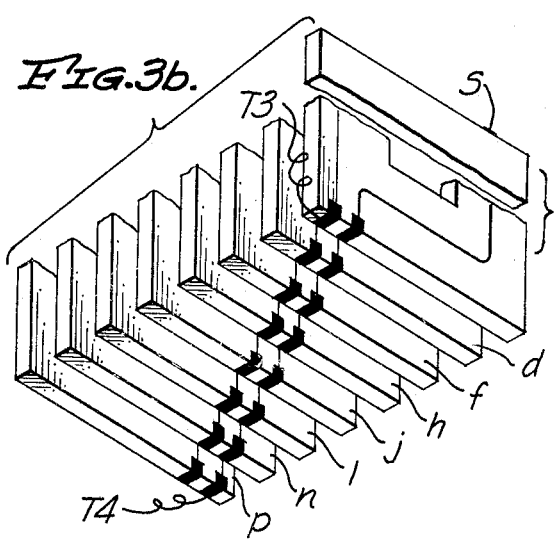
FIGURE 3b is a fragmentary exploded view of the wafers comprised in the secondary winding means of the exemplary device depicted in FIGURE 1.

As is made evident in the preceding description, conductive loops and terminals may be applied to or formed on appropriate faces of the secondary wafers $b$, $d$, $f$, $h$, $j$, $l$, $n$ and $p$, as indicated in FIGURE 3b. Also, as previously indicated, appropriately positioned auxiliary bridging conductive devices $s$ may similarly be provided on edges of the primary wafers, whereby serial connection of the conductor loops or turns of the secondary wafers is effected when the two interleaved sets of wafers are brought into face-to-back stacked and aligned juxtaposition as indicated in FIGURE 1. If desirable or necessary, other edges of the wafers may be employed for terminal placement. Secondary winding terminal wire leads T3 and T4 are provided to facilitate external connection of the transformer secondary in a circuit, the wires being soldered, brazed or spot welded to the respective terminals on wafers $b$ and $p$.

When the wafers are brought into close face-to-back contact or stacked and placed under pressure and integrally united by adhesive, additional conductive paint or the like may be applied over paired terminals $t1$ and $t2$ and bridge $s$ to ensure low-resistance and trouble-free connections. Thereafter core members 12 and 13 (FIGURE 5) are applied to the integrated wafers, the central limbs $y$, $y$ entering the opening formed by the apertures $v$ of the wafers, and the outer limbs fitting closely by the side edges of the wafers as shown in FIGURE 1. The ends of the core limbs are flat-lapped to a common plane, and hence when brought together, provide a pair of closed magnetic-flux paths of low reluctance. Prior to bringing the core members into position a thin sheet of insulation, Q (FIGURE 1), is applied to opposed ends of the laminated wafers. The insulation, Q, is preferably of mica sheet, but other materials, including ceramic sheet, may be used. The ends of the limbs of the core members may be adhesively united, and the entire transformer assembly may be encapsulated. Since encapsulation is not necessary and is well understood in the electronics arts, and may even be undesirable in some cases and is not per se the present invention, encapsulation means are not shown.

In general, and as before noted, core members of other than E-shape may be employed, especially when attainment of a low elevational profile is desired. Reference is made to the aforementioned companion application for details of core arrangement and configurations for achieving that objective. In the presently disclosed transformer the core members are preferably of configuration shown in FIGURE 5. Therein the central limbs $y$ of the cores are of cross section approximately square and of section area approximately twice that of either of the outer limbs $x$ and $z$; and the latter are each of cross section at least approximately equal to that of bridge portion $w$. If an air gap is desired, it may be produced by insertion of non-magnetic sheets between abutting pairs of core limbs.

Figure 4:
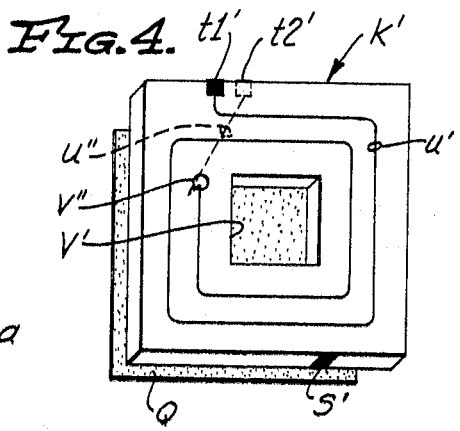
FIGURE 4 is a pictorial view of a selected wafer usable in the composite structure illustrated in FIGURE 1, showing how plural-turn coils are produced and terminated on a single wafer.

In some instances it is desirable to carry more than one turn or loop of conductor on each wafer, in the interest of providing a more compact structure, or to permit unequal numbers of primary and secondary turns with equal numbers of primary and secondary wafers, or for other reasons. In FIGURE 4 there is shown a modified form of unit, comprising a wafer $k'$ and a thin insulative sheet Q, which may be used to supply several turns of conductors per wafer. The wafer $k'$, similar to its counterpart wafer $k$ of FIGURES 1 and 2, is constructed with a central aperture $v'$ and an additional small aperture $v''$. A plural-turn conductor $u'$ is formed, extending from a terminal $t1'$ and passing around the two apertures as many times as the number of turns required, and extending into and through small aperture $v''$ to the opposite face of the wafer, to an extension $u'''$ which connects with the second terminal $t2'$. It is preferred to metallize the interior wall around aperture $v''$ prior to application of conductors $u'$ and $u'''$; and, as is evident, that may be accomplished at the time terminal and bridging conductors $t1'$, $t2'$ and $s'$ are applied. While only two conductor turns are shown on wafer $k'$, conductor $u'$ may be formed to supply as many turns as space permits. The insulative sheet Q serves to insulate conductor $u'''$ from a conductor on the face of the next-adjacent wafer of the assembly. The sheet Q may be of mica, or may be formed integral with the wafer $k'$ by application of a layer of evaporated silicon dioxide or the like over the back of the wafer and applied conductor $u'''$. As is evident, interconnection of turns of wafers of a set is accomplished in the manner previously described.

In those instances where lowest feasible elevational profile is desired, the core members 23 and 24 (FIGURES 7 and 8) are formed of U-shape generally similar to that of the core members illustrated in the aforementioned companion application; and the wafers are successively brought into position on the bridge portion of either of the cores by passing a limb of the selected core through the central aperture of the wafer and continuing until the wafer is positioned on the bridge of the core member, much as is indicated by the series of wafers $l'$, $m'$, $n'$, $o'$, in FIGURE 7. To facilitate such positioning, corner portions of the core members are beveled, as indicated at 24c in FIGURE 7. Following positioning of the proper number of wafers on the bridge of either of the cores (core 24 as illustrated), the other core (23) is superimposed on the first and adhesively united thereto to form a complete magnetic flux-path or circuit. Air gap, if desired, may be provided by insertion of a non-magnetic shim. The wafers are then adhesively united together with end insulators such as Q'. Terminal bridging and connection enhancement is effected in the manner described in connection with FIGURE 1. The wafers, such as wafer 26 (FIGURE 10) have central apertures (26a) of dimensions somewhat larger than a right cross-section of the bridge portion 24b of a core member, and are provided with one or more conductor turns or loops, and terminal and bridge conductors, in style and manner similar to the wafers previously described, and as indicated in exemplary form in FIGURE 10. The plan-form or configuration is such that when assembled on the bridge of a core member, the total height H of the inductive device assembly (FIGURE 8) is not appreciably in excess of three times the thickness (height) of a core member and is not in excess of the width dimension of an individual wafer. Thus the entire winding structure may lie below the plane of the upper surface of the inductive device, as is clearly shown in FIGURES 7 and 8.

The foregoing description of principal illustrative embodiments of the invention makes it evident that the aforementioned objects of the invention have been achieved, and that there is thereby provided an inductive device, such as a pulse transformer or an inductor, that is at once easily and inexpensively constructed and which is capable of continuous operation at temperatures very near the Curie point of the core material. By the utilization of superimposed U-core members all of the advantages in respect of low profile called out in the companion application are attained with the exception of high winding density. It is evident that large numbers of wafers of each conductor and terminal configuration can be made simultaneously, whereby manufacturing costs are reduced while still providing a very small device suitable for high-temperature operation.

While for purposes of illustrating the principles of the invention a transformer having equal numbers of primary and secondary wafers has been chosen, it is evident that unequal numbers may be utilized, and that all primary wafers can be stacked together and isolated and shielded from those of the secondary by an interposed space or shield. Also, certain of the wafers may comprise a plurality of conductor turns while others comprise but one. And all of the turns of all of the wafers may be connected serially to provide a simple reactor. Further, as is evident, the device may comprise but one, or two, wafers, depending upon the specifications to be met by the device; and that in such cases the core limbs may be made much shorter than shown. Other changes, also, may be made within the spirit and scope of the invention as defined in the appended claims.

I claim:
1. A miniature inductive device characterized by ability to operate at very high temperatures, comprising:
    first and second magnetic U-core members of like size and shape and each having opposed limbs interconnected by a bridge integral with the limbs thereof and disposed in juxtaposition with the limbs of the said core members in superposed relation for optimum magnetic flux transfer from core member to core member and said core members being arranged to provide a complete magnetic circuit;
    wafer means, comprising a small very thin insulative wafer having an aperture therethrough from face to face thereof and having a portion of one only of said core members extending therethrough;
    conductive coil means, including on said wafer a respective thin adherent conductor at least substantially encircling said aperture and inductively linked to said magnetic circuit; and
    terminal means, including a terminal pair comprising a respective conductive terminal for each end of said thin adherent conductor on said wafer electrically connected to a respective end of said conductor.
2. A miniature inductive device according to claim 1, in which a plurality of additional wafers are disposed on said bridge of said one of said core members in close face-to-back relationship with each bearing a respective conductive coil means and means electrically connecting the respective coil means in series.
3. A miniature inductive device according to claim 2, in which the thickness of either of said core members is of the order of one-third of the width of either of said wafers, whereby the total height of said device is not in excess of about the width of either of said wafers.

References Cited
UNITED STATES PATENTS
| | | | |
|---|---|---|---|
| 2,316,928 | 4/1943 | Woodward | 336—234 XR |
| 3,085,899 | 4/1963 | Forman. | |
| 3,089,106 | 5/1963 | Saaty | 336—200 |
| 3,238,480 | 3/1966 | Killoran | 336—200 XR |

FOREIGN PATENTS
| | | |
|---|---|---|
| 1,185,354 | 7/1959 | France. |
| 906,831 | 3/1954 | Germany. |
| 694,643 | | Great Britain. |

THOMAS J. KOZMA, Primary Examiner

U.S. Cl. X.R.

336—183, 200, 232